(12) United States Patent
Nakatsuji et al.

(10) Patent No.: US 11,125,270 B2
(45) Date of Patent: Sep. 21, 2021

(54) BEARING DEVICE FOR WHEEL

(71) Applicant: NTN CORPORATION, Osaka (JP)

(72) Inventors: Yuta Nakatsuji, Iwata (JP); Natsuko Nagai, Iwata (JP)

(73) Assignee: NTN CORPORATION, Osaka (JP)

( * ) Notice: Subject to any disclaimer, the term of this patent is extended or adjusted under 35 U.S.C. 154(b) by 81 days.

(21) Appl. No.: 16/488,791

(22) PCT Filed: Jan. 15, 2018

(86) PCT No.: PCT/JP2018/000820
§ 371 (c)(1),
(2) Date: Aug. 26, 2019

(87) PCT Pub. No.: WO2018/154999
PCT Pub. Date: Aug. 30, 2018

(65) Prior Publication Data
US 2020/0386269 A1 Dec. 10, 2020

(30) Foreign Application Priority Data

Feb. 27, 2017 (JP) .............................. JP2017-035581

(51) Int. Cl.
*F16C 19/18* (2006.01)
*F16C 33/58* (2006.01)
*F16C 33/78* (2006.01)

(52) U.S. Cl.
CPC .......... *F16C 19/184* (2013.01); *F16C 33/581* (2013.01); *F16C 33/7823* (2013.01); *F16C 2326/02* (2013.01)

(58) Field of Classification Search
CPC .... F16C 19/184; F16C 19/186; F16C 33/581; F16C 33/7823; F16C 33/7876;
(Continued)

(56) References Cited

U.S. PATENT DOCUMENTS

| 5,494,358 A | 2/1996 | Dougherty |
| 8,308,371 B2 | 11/2012 | Komori |

(Continued)

FOREIGN PATENT DOCUMENTS

| CN | 205559566 | 9/2016 |
| CN | 208634208 | 3/2019 |

(Continued)

OTHER PUBLICATIONS

Machine Translation of JP-2013190102-A (Year: 2013).*
(Continued)

*Primary Examiner* — Alan B Waits
(74) *Attorney, Agent, or Firm* — Wenderoth, Lind & Ponack, L.L.P.

(57) ABSTRACT

A bearing device for a wheel is configured such that: bolt insertion holes are provided in a vehicle body mounting flange of an outer member; knuckle bolts are inserted through the bolt insertion holes; bolt press-fitting holes are provided in a wheel mounting flange of a hub ring; and hub bolts are press-fitted in the bolt press-fitting holes. A dam section protruding radially outward is provided on an outer-side outer periphery of the outer member, and a cutout through which a tightening tool for tightening the knuckle bolts can be inserted through the bolt insertion holes is defined in the dam section.

5 Claims, 20 Drawing Sheets

(58) Field of Classification Search
CPC .............. F16C 33/7886; F16C 33/805; F16C 2326/02; B60B 27/0073
See application file for complete search history.

(56) References Cited

U.S. PATENT DOCUMENTS

| | | | | |
|---|---|---|---|---|
| 2007/0086690 | A1* | 4/2007 | Niebling | B60B 27/00 384/544 |
| 2007/0278748 | A1* | 12/2007 | Matsui | F16C 33/7876 277/549 |
| 2009/0154857 | A1 | 6/2009 | Komori | |
| 2017/0368873 | A1 | 12/2017 | Nakatsuji et al. | |

FOREIGN PATENT DOCUMENTS

| | | | |
|---|---|---|---|
| JP | 2007-126087 | 5/2007 | |
| JP | 2007-285322 | 11/2007 | |
| JP | 2008-168817 | 7/2008 | |
| JP | 2011-007272 | 1/2011 | |
| JP | 2011-251668 | 12/2011 | |
| JP | 2013-194908 | 9/2013 | |
| JP | 2013190102 A * | 9/2013 | ............ F16C 33/805 |
| JP | 2015017674 A * | 1/2015 | .......... F16C 33/7876 |
| JP | 2016-168860 | 9/2016 | |
| WO | 2015/005195 | 1/2015 | |

OTHER PUBLICATIONS

Machine Translation of JP-2015017674-A (Year: 2015).*
First Office Action dated Jun. 17, 2020 in corresponding Chinese Patent Application No. 201810157263.1.
International Search Report dated Apr. 17, 2018 in International (PCT) Application No. PCT/JP2018/000820.

* cited by examiner

XIVA-XIVA cross section

XIVB-XIVB cross section

BEARING DEVICE FOR WHEEL

TECHNICAL FIELD

The present invention relates to a bearing device for a wheel.

BACKGROUND ART

Conventionally, there has been known a bearing device for a wheel, which rotatably supports the wheel. In the bearing device for a wheel, an outer member is fixed to a knuckle constituting a suspension device and a case constituting an in-wheel motor. In the bearing device for a wheel, an inner member is disposed inside the outer member, and a plurality of rolling elements are interposed between a rolling surface of the outer member and a rolling surface of the inner member. Thus, the bearing device for a wheel constitutes a rolling bearing structure, and the wheel attached to the inner member is rotatable.

In such a bearing device for a wheel, when a foreign matter such as muddy water or dust enters an annular space formed by the outer member and the inner member, then the rolling surface, the rolling element, and the like are damaged, and the bearing life is shortened. When the grease sealed in the annular space leaks, the rolling surface and the rolling element are also damaged, and the bearing life is shortened. For this reason, the bearing device for a wheel includes a seal member that closes both side opening ends of the annular space in order to prevent entry of the foreign matter such as muddy water and dust and to prevent leakage of grease.

The bearing device for a wheel disclosed in Patent Literature 1 includes an outer member, an inner member, a plurality of rolling elements, and a seal member that closes both side opening ends of an annular space formed by the outer member and the inner member. However, in such a bearing device for a wheel, when muddy water flowing through the outer member, muddy water flowing down from the vehicle body, muddy water splashed onto the wheel, or the like reaches the seal member, a foreign matter contained in the muddy water is jammed into the seal member, and the seal member may be damaged or worn. In other words, the sealing property of the seal member may be deteriorated.

In the bearing device for a wheel described in Patent Literature 2, in order to prevent muddy water from reaching the seal member on an outer side (here, "outer side" represents the wheel side of the bearing device for a wheel when attached to the vehicle body), a weir portion projecting radially outward is provided on the outer-side outer circumference of the outer member. However, in such a bearing device for a wheel, for example, when attached to a knuckle, a knuckle bolt is inserted into a bolt insertion hole of a vehicle body mounting flange and screwed into a bolt fastening hole of the knuckle, and in this specification, there is a problem that a fastening tool of the knuckle bolt interferes with the weir portion (see FIG. 19). In such a bearing device for a wheel, a hub bolt is press-fitted into a bolt press-fitting hole of a wheel mounting flange so that the head portion of the hub bolt is in close proximity to the weir portion. Therefore, there is also a problem that the head portion of the hub bolt interferes with the weir portion when the hub bolt is replaced (see FIG. 20).

CITATIONS LIST

Patent Literature

Patent Literature 1: JP-A 2016-168860 Gazette
Patent Literature 2: JP-A 2011-7272 Gazette

SUMMARY OF INVENTION

Technical Problems

The present invention provides a bearing device for a wheel that can prevent a fastening tool of a knuckle bolt from interfering with a weir portion when the knuckle bolt is fastened. The present invention provides a bearing device for a wheel that can prevent the head portion of a hub bolt from interfering with a weir portion when a replacement operation of a hub bolt is performed.

Solutions to Problems

A first invention is a bearing device for a wheel, the bearing device including:

an outer member that is formed with an outer rolling surface on an inner circumference of the outer member;

an inner member that includes a hub ring that is formed with an axially extending small-diameter step portion and at least one inner ring that is fitted to the small-diameter step portion, the inner member being formed with an inner rolling surface on an outer circumference of the inner member;

a plurality of rolling elements that are rollably interposed between the rolling surface of the outer member and the rolling surface of the inner member; and a seal member that closes both side opening ends of an annular space formed by the outer member and the inner member, wherein a vehicle body mounting flange is formed on the outer member, and a plurality of bolt insertion holes are provided on the vehicle body mounting flange, so that a knuckle bolt is inserted through each of the bolt insertion holes, a wheel mounting flange is formed on the hub ring, and a plurality of bolt press-fitting holes are provided at equal intervals concentrically about a rotation axis of the wheel mounting flange, so that a hub bolt is press-fitted in each of the bolt press-fitting holes, a weir portion that projects radially outward is provided on an outer-side outer circumference of the outer member, and the weir portion is formed with a notch portion for passing a fastening tool of the knuckle bolt inserted into the bolt insertion hole.

A second invention is the bearing device for a wheel according to the first invention, wherein when phases of the bolt insertion hole and the bolt press-fitting hole are matched by rotating the wheel mounting flange, the notch portion is formed so that a head portion of the hub bolt fits inside an inscribed circle centered on the bolt press-fitting hole.

A third invention is the bearing device for a wheel according to the second invention, wherein
a plurality of the notch portions are formed; and
each of the notch portions is formed so that a head portion of the hub bolt fits inside an inscribed circle centered on the bolt press-fitting hole.

A fourth invention is the bearing device for a wheel according to any of the first to third inventions, wherein
an outer edge portion of the weir portion is formed of an elastic body; and the notch portion is formed in the elastic body.

A fifth invention is the bearing device for a wheel according to any of the first to fourth inventions, wherein
on an assumption of a vertical direction line that intersects with the rotation axis when the rotation axis is horizontal,
the notch portion is formed at a position that does not intersect with the vertical direction line.

A sixth invention is the bearing device for a wheel according to the fifth invention, wherein
the weir portion has a high weir portion having a large dimension from a radially inner end to a radially outer end; and
the high weir portion is formed at a position that intersects with the vertical direction line.

Advantageous Effects of Invention

The bearing device for a wheel according to the first invention is provided with the weir portion that projects radially outward on the outer-side outer circumference of the outer member. The weir portion is formed with the notch portion for passing a fastening tool of the knuckle bolt inserted into the bolt insertion hole. According to the bearing device for a wheel, the fastening tool of the knuckle bolt can be prevented from interfering with the weir portion when the knuckle bolt is fastened.

In the bearing device for a wheel according to the second invention, when phases of the bolt insertion hole and the bolt press-fitting hole are matched by rotating the wheel mounting flange, the notch portion is formed so that a head portion of the hub bolt fits inside an inscribed circle centered on the bolt press-fitting hole. According to the bearing device for a wheel, the head portion of the hub bolt can be prevented from interfering with a weir portion when the replacement operation of the hub bolt is performed.

The bearing device for a wheel according to the third invention is formed with the plurality of notch portions. Each of the notch portions is formed so that the head portion of the hub bolt fits inside an inscribed circle centered on the bolt press-fitting hole. According to the bearing device for a wheel, a plurality of hub bolts overlap the notch portion at the same time, so that the replacement operation can be smoothly carried out.

In the bearing device for a wheel according to the fourth invention, the outer edge portion of the weir portion is composed of an elastic body. The notch portion is formed in the elastic body. According to this bearing device for a wheel, even if the fastening tool of the knuckle bolt interferes with the weir portion, deformation or the like of the weir portion can be prevented. Even if the head portion of the hub bolt interferes with the weir portion, deformation or the like of the weir portion can be prevented. Therefore, the fastening operation and the replacement operation can be smoothly carried out.

In the bearing device for a wheel according to the fifth invention, on an assumption of the vertical direction line that intersects with the rotation axis when the rotation axis is horizontal, the notch portion is formed at a position that does not intersect with the vertical direction line. According to this bearing device for a wheel, on an upper side of the outer member, muddy water flowing through the outer member, muddy water flowing down from the vehicle body, and the like are less likely to reach the seal member on the outer side through the notch portion. Further, on a lower side of the outer member, muddy water or the like splashed onto the wheel is less likely to reach the seal member on the outer side through the notch portion. Therefore, it is possible to prevent the sealing property of the seal member on the outer side from dropping.

In the bearing device for a wheel according to the sixth invention, the weir portion has the high weir portion having a large dimension from the radially inner end to the radially outer end. The high weir portion is formed at a position that intersects with the vertical direction line. According to this bearing device for a wheel, on the upper side of the outer member, muddy water flowing through the outer member, muddy water flowing down from the vehicle body, and the like are less likely to reach the seal member on the outer side over the weir portion. On the lower side of the outer member, muddy water or the like splashed onto the wheel is less likely to reach the seal member on the outer side over the weir portion. Therefore, it is possible to further suppress the sealing property of the seal member on the outer side from dropping.

DESCRIPTION OF EMBODIMENTS

Figure 1:
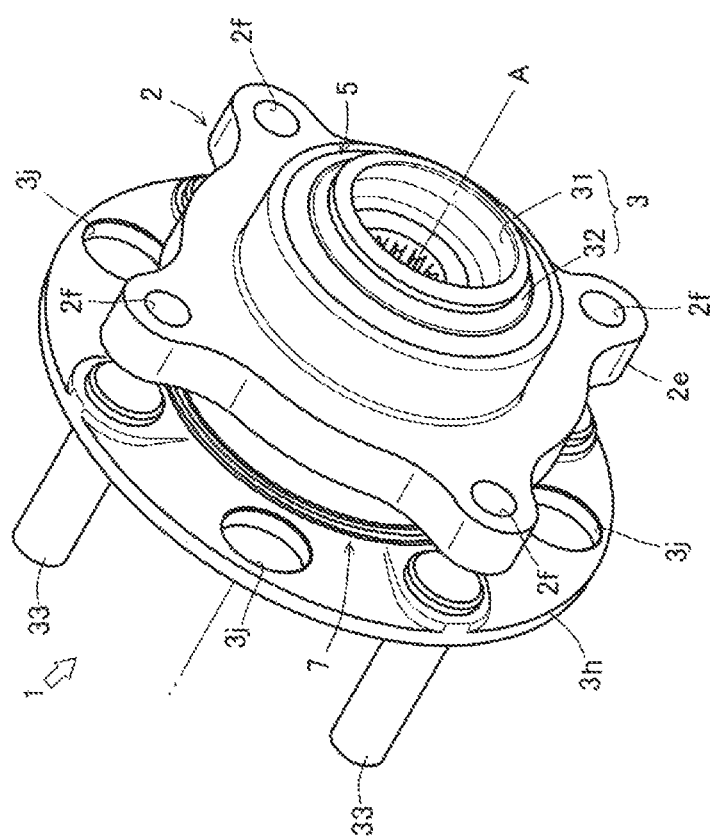
FIG. 1 is a perspective view showing a bearing device for a wheel.
Figure 2:
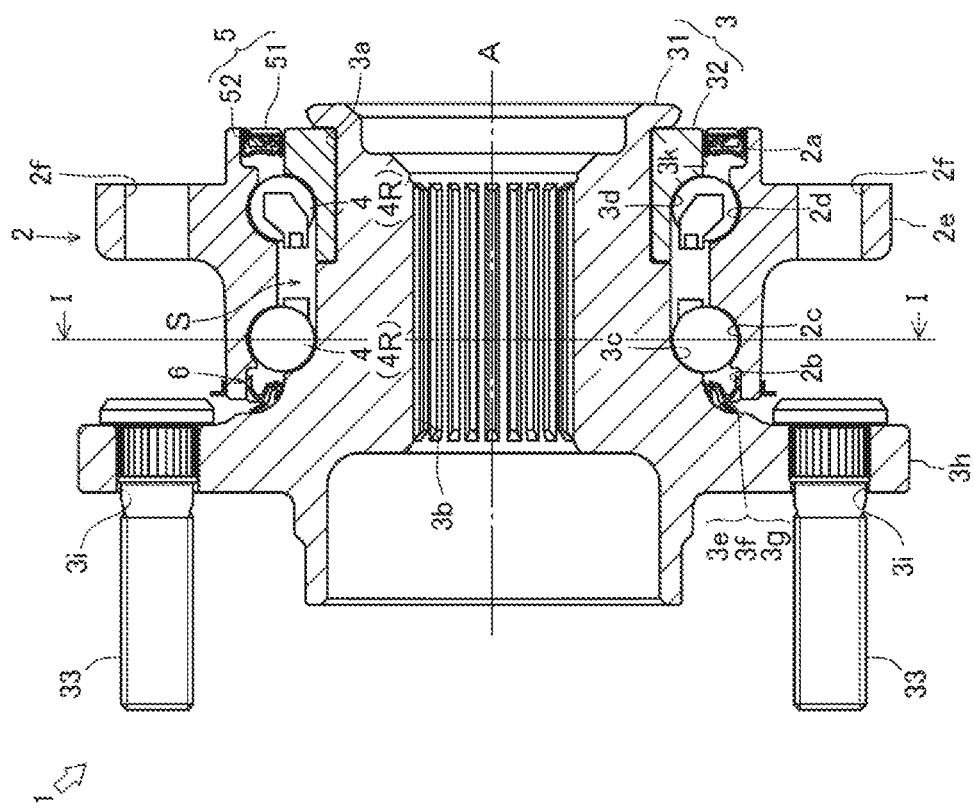
FIG. 2 is a sectional view showing a structure of the bearing device for a wheel.
Figure 3:
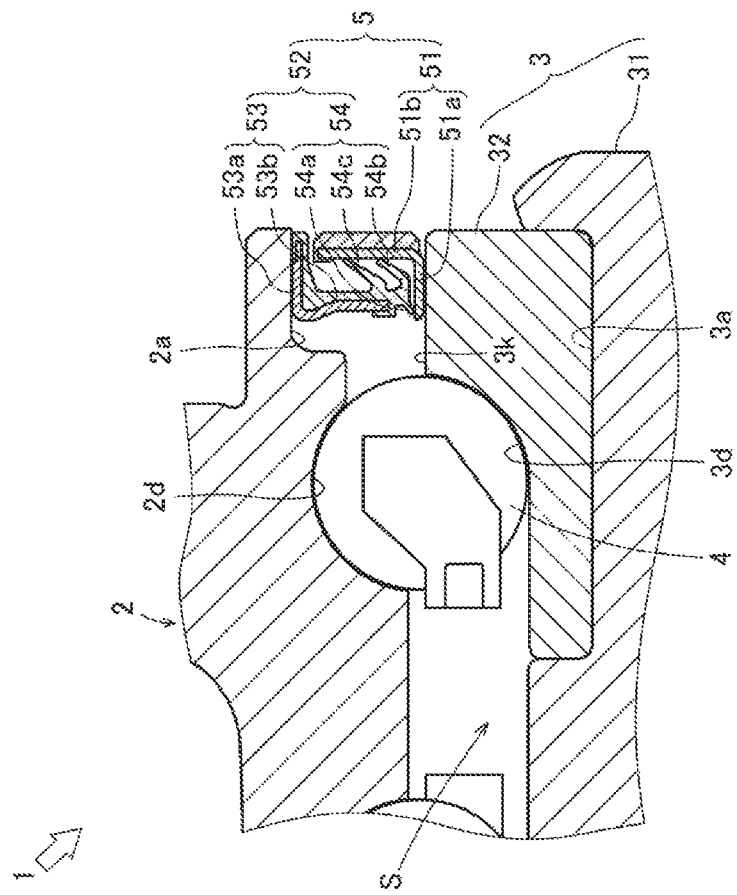
FIG. 3 is a sectional view showing a partial structure of the bearing device for wheel.
Figure 4:
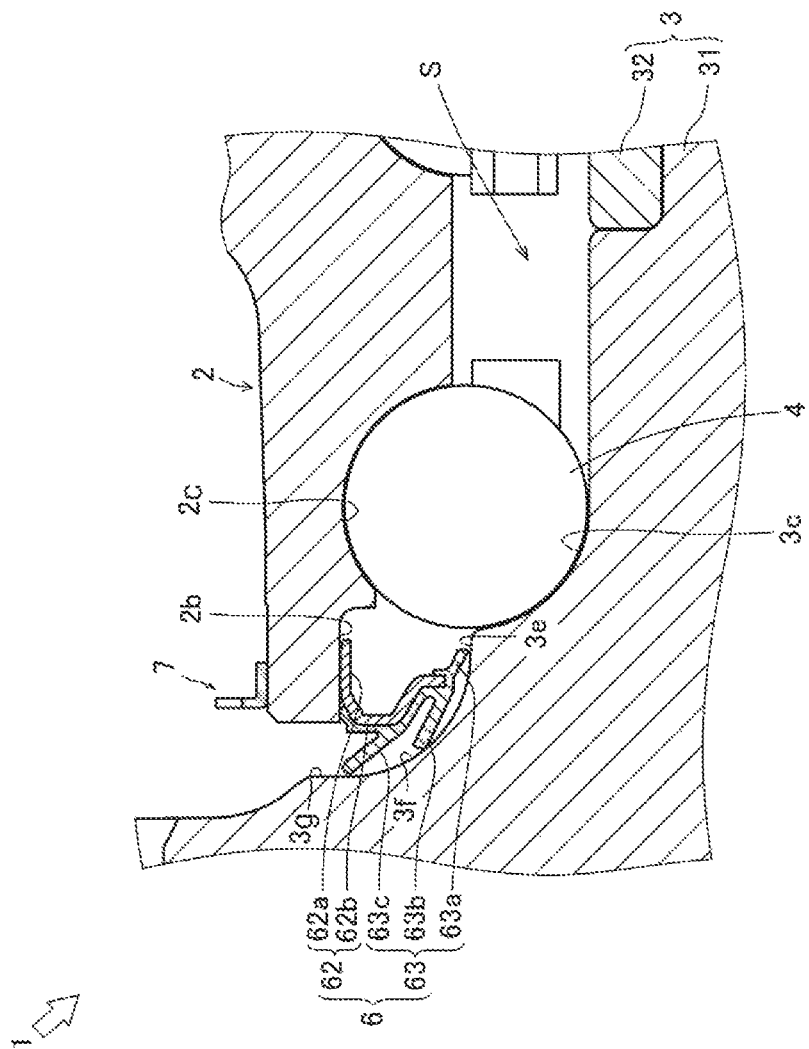
FIG. 4 is a sectional view showing a partial structure of the bearing device for wheel.

First, a bearing device 1 for a wheel according to the present invention will be described with reference to FIGS. 1 to 4. FIG. 1 is a perspective view showing the bearing device 1 for a wheel. FIG. 2 is a sectional view showing the structure of the bearing device 1 for a wheel. FIGS. 3 and 4 are sectional views showing partial structures of the bearing device 1 for a wheel.

The bearing device 1 for a wheel rotatably supports a wheel. The bearing device 1 for a wheel includes an outer member 2, an inner member 3, a rolling element 4, an inner-side seal member 5, and an outer-side seal member 6. In the present description, "inner side" indicates the vehicle body side of the bearing device 1 for a wheel when attached to the vehicle body, and "outer side" indicates the wheel side of the bearing device 1 for a wheel when attached to the vehicle body.

The outer member 2 constitutes an outer ring portion of a rolling bearing structure. The outer member 2 is made of medium to high carbon steel such as S53C. A seal surface 2a is formed at an inner-side end portion of the outer member 2. A seal surface 2b is formed at an outer-side end portion of the outer member 2. Two outer rolling surfaces 2c and 2d are formed on the inner circumference of the outer member 2. The outer rolling surface 2c faces an inner rolling surface 3c described later. The outer rolling surface 2d faces an inner rolling surface 3d described later. For example, induction hardening is applied to the outer rolling surfaces 2c and 2d, and the surface hardness is in a range of 58 to 64 HRC. In addition, a vehicle body mounting flange 2e is integrally formed on the outer circumference of the outer member 2. The vehicle body mounting flange 2e is provided with a plurality of bolt insertion holes 2f.

The inner member 3 constitutes an inner ring portion of the rolling bearing structure. The inner member 3 includes a hub ring 31 and an inner ring 32.

The hub ring 31 is made of medium to high carbon steel such as S53C. A small-diameter step portion 3a is formed in the hub ring 31 from its inner-side end portion to axial center portion. The small-diameter step portion 3a refers to a portion where the outer diameter of the hub ring 31 is small, and its outer circumferential surface has a cylindrical shape centered on a rotation axis A. The hub ring 31 is formed with a universal joint mounting hole 3b extending from its inner-side end portion to outer-side end portion. The universal joint mounting hole 3b refers to a through hole provided at the center of the hub ring 31, and its inner circumferential surface has a concavo-convex shape (spline hole) in which concave portions and convex portions are alternately arranged. However, the universal joint mounting hole 3b is not formed in a driven specification. The inner rolling surface 3c is formed on the outer circumference of the hub ring 31. The inner rolling surface 3c faces the outer rolling surface 2c described above. For example, induction hardening is applied from the small-diameter step portion 3a to a seal land portion (constituted with an axial surface portion 3e, a curved surface portion 3f, and a side surface portion 3g, which are described later) via the inner rolling surface 3c, and the surface hardness is in the range of 58 to 64 HRC. In addition, a wheel mounting flange 3h is integrally formed on the outer circumference of the hub ring 31. The wheel mounting flange 3h is provided with a plurality of bolt press-fitting holes 3i at equal intervals (e.g., four locations at every 90° phase angle) concentrically around the rotation axis A, and a hub bolt 33 is press-fitted into each of the bolt press-fitting holes 3i. The wheel mounting flange 3h is provided with a plurality of tool insertion holes 3j at equal intervals (e.g., four locations at every 90° phase angle) concentrically in a similar manner.

The inner ring 32 is made of high carbon chromium bearing steel such as SUJ2. A seal surface 3k is formed on the outer circumference of the inner ring 32. The inner rolling surface 3d is formed on the outer circumference of the inner ring 32. The inner ring 32 is fitted (external fitting) in the small-diameter step portion 3a of the hub ring 31, thereby forming the inner rolling surface 3d on the outer circumference of the hub ring 31. The inner rolling surface 3d faces the inner rolling surface 2d described above. The inner ring 32 is subjected to so-called immersion quenching, and is in the range of 58 to 64 HRC up to a core portion.

The rolling element 4 constitutes a rolling portion of the rolling bearing structure. The rolling element 4 is made of high carbon chromium bearing steel such as SUJ2. An inner-side rolling element row 4R has a plurality of the rolling elements 4 arranged annularly by means of a cage. Each of the rolling elements 4 is rotatably interposed between the outer rolling surface 2d of the outer member 2 and the inner rolling surface 3d of the inner member 3. On the other hand, an outer-side rolling element row 4R also has the plurality of rolling elements 4 arranged annularly by means of a cage. Each of the rolling elements 4 is rotatably interposed between the outer rolling surface 2c of the outer member 2 and the inner rolling surface 3c of the inner member 3. The rolling element 4 is subjected to so-called immersion quenching, and is in the range of 62 to 67 HRC up to the core portion.

The inner-side seal member 5 seals the inner-side end portion of an annular space S formed between the outer member 2 and the inner member 3. However, the inner-side seal member 5 is not limited to the present specification because various specifications exist. There are also specifications in which a cap is attached instead of the inner-side seal member 5 and specifications in which no cap is attached.

The inner-side seal member 5 includes a slinger 51. The slinger 51 is fitted (external fitting) to the seal surface 3k of the inner ring 32. The slinger 51 is made of, for example, a stainless steel plate such as SUS430 or SUS304, or a cold rolled steel plate such as SPCC. In the slinger 51, an annular steel plate is deformed by press work and an axial cross section is bent into a substantially L-shape. Thus, the slinger 51 is formed with a cylindrical fitting portion 51a and a disk-shaped side plate portion 51b that extends from an end portion of the cylindrical fitting portion 51a towards the outer member 2.

The inner-side seal member 5 includes a seal ring 52. The seal ring 52 is fitted (internal fitting) to a fitting portion 2a of the outer member 2. The seal ring 52 is composed of a core metal 53 and a seal rubber 54. The core metal 53 is made of, for example, a stainless steel plate such as SUS430 or SUS304, or a cold rolled steel plate such as SPCC. In the core metal 53, an annular steel plate is deformed by press work and an axial cross section is bent into a substantially L-shape. Thus, the core metal 53 is formed with a cylindrical fitting portion 53a and a disk-shaped side plate portion 53b that extends from the end portion of the cylindrical fitting portion 53a towards the inner ring 32. A seal rubber 54, which is an elastic body, is formed integrally in the fitting portion 53a and the side plate portion 53b, for example, by vulcanization adhesion.

The seal rubber 54 is made of, for example, synthetic rubber such as NBR (acrylonitrile butadiene rubber), HNBR (hydrogenated acrylonitrile butadiene rubber), EPDM (ethylene propylene rubber), ACM (polyacrylic rubber), FKM (fluorinated rubber), or silicon rubber. The tip end edge of a seal lip 54a formed on the seal rubber 54 is in contact with the fitting portion 51a of the slinger 51. The tip end edges of seal lips 54b and 54c are in contact with the side plate portion 51b of the slinger 51. In this way, the inner-side seal member 5 prevents a foreign matter such as muddy water or dust from entering the annular space S and prevents grease from leaking from the annular space S.

The outer-side seal member 6 seals the outer-side end portion of the annular space S formed between the outer member 2 and the inner member 3. However, the outer-side seal member 6 is not limited to the present specification because various specifications exist.

The outer-side seal member 6 is fitted (internal fitting) to a fitting portion 2b of the outer member 2. The outer-side seal member 6 is composed of a core metal 62 and a seal rubber 63. The core metal 62 is made of, for example, a stainless steel plate such as SUS430 or SUS304, or a cold rolled steel plate such as SPCC. In the core metal 62, an annular steel plate is deformed by press work and an axial cross section is bent into a substantially L-shape. Thus, the core metal 62 is formed with a cylindrical fitting portion 62a and a disk-shaped side plate portion 62b that extends from the end portion of the cylindrical fitting portion 62a towards the hub ring 31. A seal rubber 63, which is an elastic body, is formed integrally in the fitting portion 62a and the side plate portion 62b, for example, by vulcanization adhesion.

The seal rubber 63 is made of, for example, synthetic rubber such as NBR (acrylonitrile butadiene rubber), HNBR (hydrogenated acrylonitrile butadiene rubber), EPDM (ethylene propylene rubber), ACM (polyacrylic rubber), FKM (fluorinated rubber), or silicon rubber. The tip end edge of a seal lip 63a formed on the seal rubber 63 is in contact with the axial surface portion 3e of the hub ring 31. The tip end edge of a seal lip 63b is in contact with the curved surface portion 3f of the hub ring 31. Further, the tip end edge of a seal lip 63c is in contact with the side surface portion 3g of the hub ring 31. In this way, the outer-side seal member 6 prevents a foreign matter such as muddy water or dust from entering the annular space S and prevents grease from leaking from the annular space S.

Figure 5:
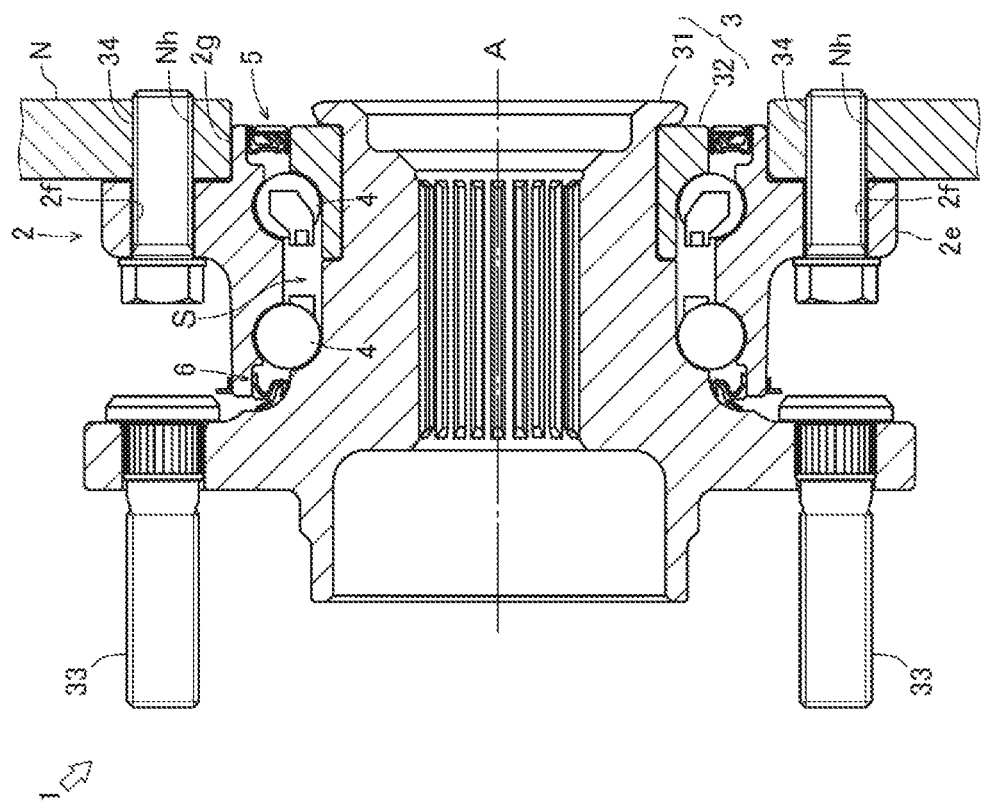
FIG. 5 is a sectional view showing a fastening structure of the bearing device for wheel.

Next, the fastening structure of the bearing device 1 for a wheel will be described with reference to FIG. 5. FIG. 5 is a sectional view showing the fastening structure of the bearing device 1 for a wheel.

The bearing device 1 for a wheel is mounted to a vehicle body using a pilot 2g and the vehicle body mounting flange 2e. Specifically, the bearing device 1 for a wheel is mounted via a knuckle bolt 34 in a state where the cylindrical shape pilot 2g is fitted in a round hole of a knuckle N and an end face of the vehicle body mounting flange 2e is in contact with an end face of the knuckle N. At this time, the knuckle bolt 34 is inserted into the bolt insertion hole 2f of the vehicle body mounting flange 2e from the outer side and screwed into a bolt fastening hole Nh of the knuckle N. Therefore, the step of mounting the bearing device 1 for a wheel includes an operation of inserting the knuckle bolt 34 into the bolt insertion hole 2f of the vehicle body mounting flange 2e and tightening it (fastening operation). The bearing device 1 for a wheel may be mounted to a case constituting an in-wheel motor. In this case, the vehicle body mounting flange 2e is mounted via a case bolt in a state where the end face of the vehicle body mounting flange 2e is in contact with an end face of the case. At this time, the case bolt is inserted into the bolt insertion hole 2f of the vehicle body mounting flange 2e from the outer side and screwed into a bolt fastening hole of the case.

Figure 6:
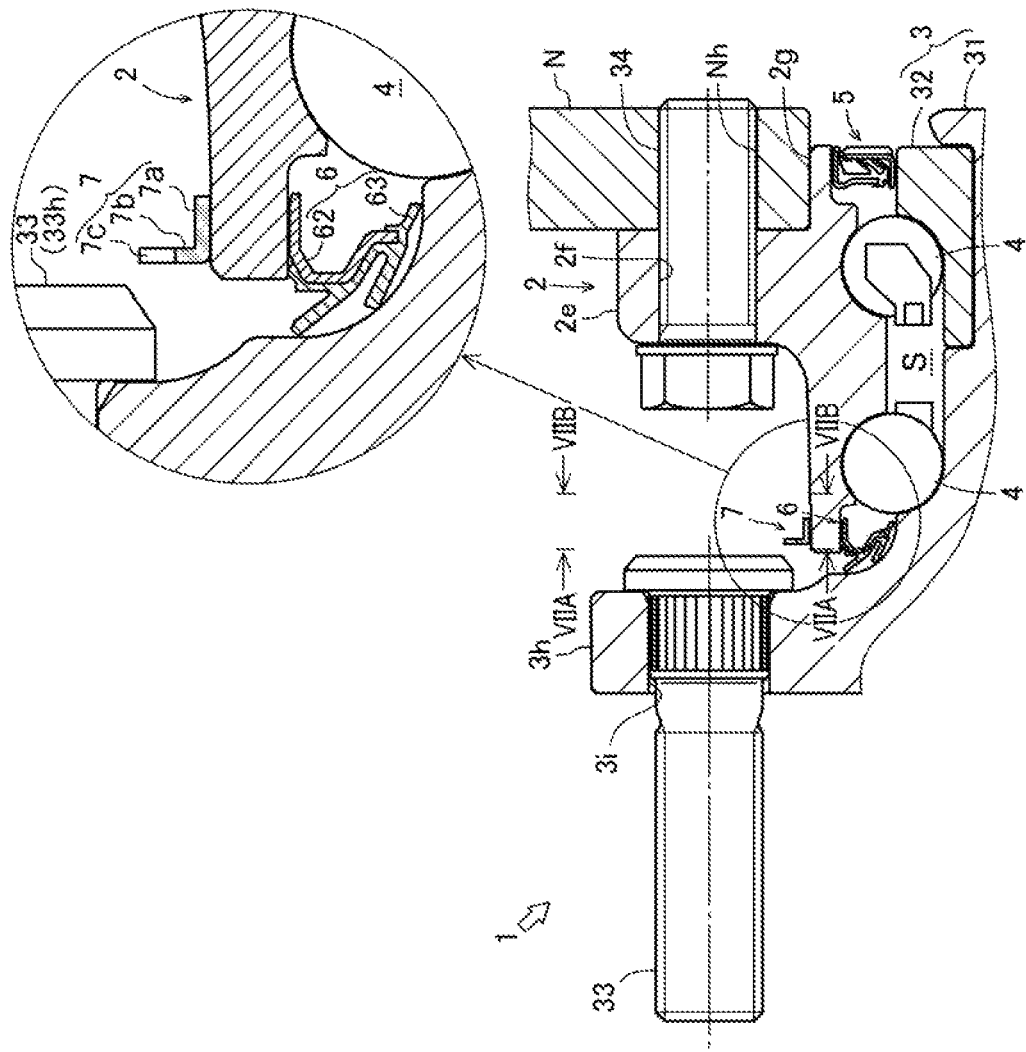
FIG. 6 is a sectional view showing a weir member according to a first embodiment.

Next, the weir member 7 according to the first embodiment will be described with reference to FIGS. 6 and 7. FIG. 6 is a sectional view showing the weir member 7 according to the first embodiment. FIG. 7 is a sectional view showing the VIIA-VIIA cross section and the VIIB-VIIB cross section in FIG. 6. Hereinafter, "radially outside/outward" represents a direction away from the rotation axis A, and "radially inside/inward" represents a direction towards the rotation axis A.

The weir member 7 is fitted to the outer-side outer circumference (outer circumference at the outer-side end portion) of the outer member 2. The weir member 7 is made of, for example, a stainless steel plate such as SUS430 or SUS304, or a cold rolled steel plate such as SPCC. In the weir member 7, an annular steel plate is bent by press work and is formed in a substantially L-shape in an axial sectional view. Thus, the weir member 7 is formed with a cylindrical fitting portion 7a and a disk-shaped standing plate portion 7b that extends radially outward from an end portion of the fitting portion 7a. The standing plate portion 7b is formed with a notch portion 7c recessed radially inward from an outer edge of the standing plate portion 7b. However, the weir member 7 is not limited to anything other than the fact that it constitutes the weir portion. For example, the material and the shape are not limited.

Figure 7B:
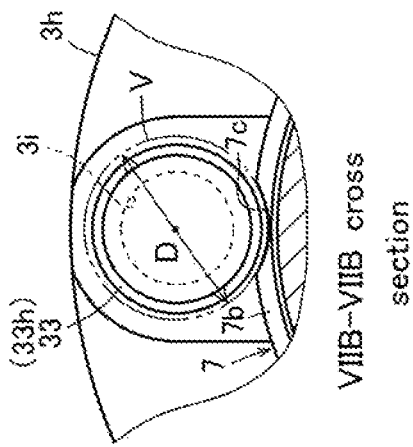
FIGS. 7A and 7B are cross sectional views taken along section lines VIIA-VIIA and VIM-VIM, respectively, in FIG. 6.
Figure 7A:
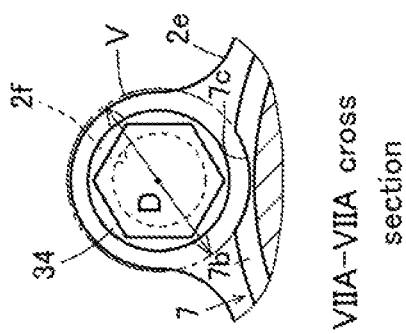

As shown in FIG. 7A, the notch portion 7c has an arc shape as viewed axially, and is formed so that the center of an inscribed circle V overlaps (is coaxial) with the center of the bolt insertion hole 2f. A diameter D of the inscribed circle V is larger than a diameter E (see FIG. 9) of the knuckle bolt 34. The diameter D of the inscribed circle V is larger than a diameter F (see FIG. 9) of the fastening tool 34T of the knuckle bolt 34. Furthermore, the diameter D of the inscribed circle V is equal to or slightly larger than a diameter G (see FIG. 9) of the tool insertion hole 3j. Therefore, these relationships satisfy D≥G>F>E.

At the same time, as shown in FIG. 7B, the notch portion 7c has an arc shape as viewed axially, and is formed so that the center of an inscribed circle V overlaps (is coaxial) with the center of the bolt press-fitting hole 3i. The diameter D of the inscribed circle V is larger than a diameter H (see FIG. 11) of a head portion 33h of the hub bolt 33. Therefore, these relationships satisfy D>H. Note that the bearing device 1 for a wheel is designed so as to satisfy D≥G>F>H>E but G>F>H>E is not limited.

Figure 8:
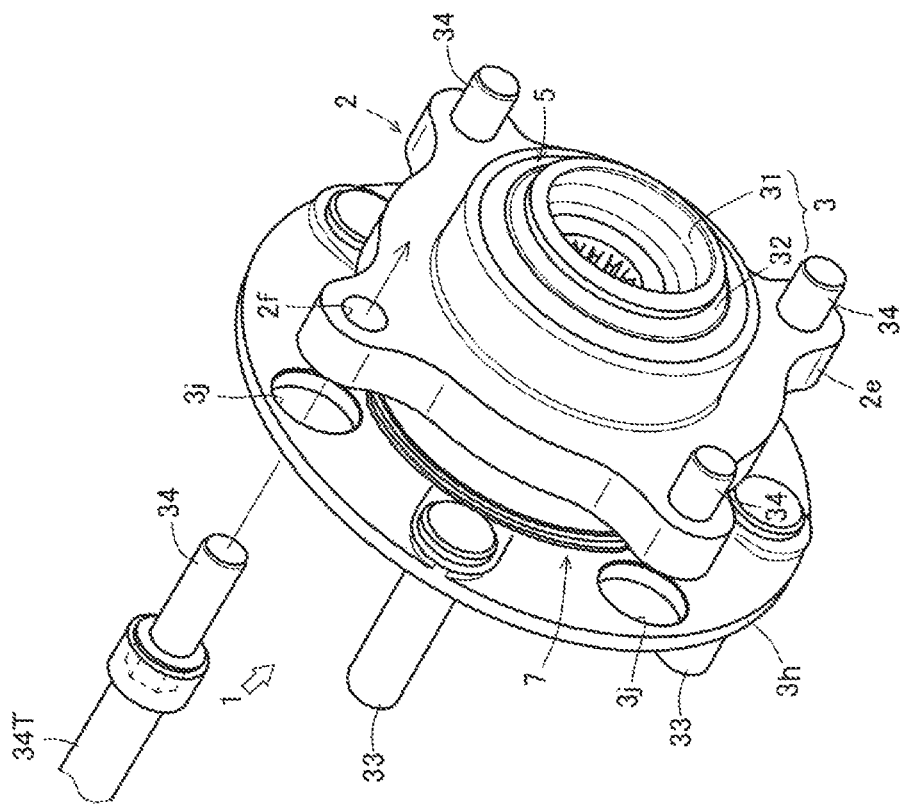
FIG. 8 is a perspective view showing a fastening operation of a knuckle bolt.
Figure 9:
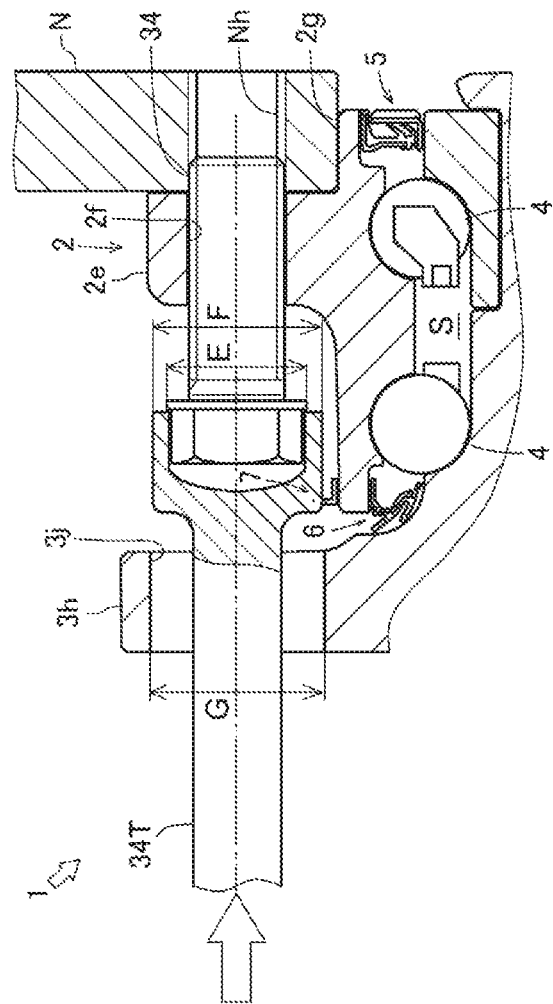
FIG. 9 is a sectional view showing that a fastening tool of the knuckle bolt does not interfere with the weir member.

Next, the operation of fastening the knuckle bolt 34 will be described with reference to FIGS. 8 and 9. FIG. 8 is a perspective view showing the operation of fastening the knuckle bolt 34. FIG. 9 is a sectional view showing that the fastening tool 34T of the knuckle bolt 34 does not interfere with the weir member 7. The fastening operation of the knuckle bolt 34 is performed by rotating the wheel mounting flange 3h so that the bolt insertion hole 2f and the tool insertion hole 3j are in phase with each other. That is, the phases are matched such that the center of the bolt insertion hole 2f and the center of the tool insertion hole 3j overlap (coaxial) with each other. At this time, the center of the tool insertion hole 3j and the center of the notch portion 7c also overlap (coaxial) with each other.

In the fastening operation of the knuckle bolt 34, the knuckle bolt 34 is attached to the fastening tool 34T, and is inserted into the bolt insertion hole 2f of the vehicle body mounting flange 2e through the tool insertion hole 3j. Then, the knuckle bolt 34 is rotated and fastened by rotating the fastening tool 34T. Since the diameter F of the fastening tool 34T is slightly smaller than the diameter G of the tool insertion hole 3j, the fastening tool 34T is guided along the inner circumferential surface of the tool insertion hole 3j without rattling.

As described above, the bearing device 1 for a wheel is provided with the weir portion (refers to the weir member 7 in the bearing device 1 for a wheel) that projects radially outward on the outer-side outer circumference of the outer member 2. The weir portion (the weir member 7) is formed with the notch portion 7c through which the fastening tool 34T of the knuckle bolt 34 inserted through the bolt insertion hole 2f passes. According to the bearing device 1 for a wheel, the fastening tool 34T of the knuckle bolt 34 can be prevented from interfering with the weir portion (the weir member 7) when the fastening operation of the knuckle bolt 34 is performed.

Figure 10:
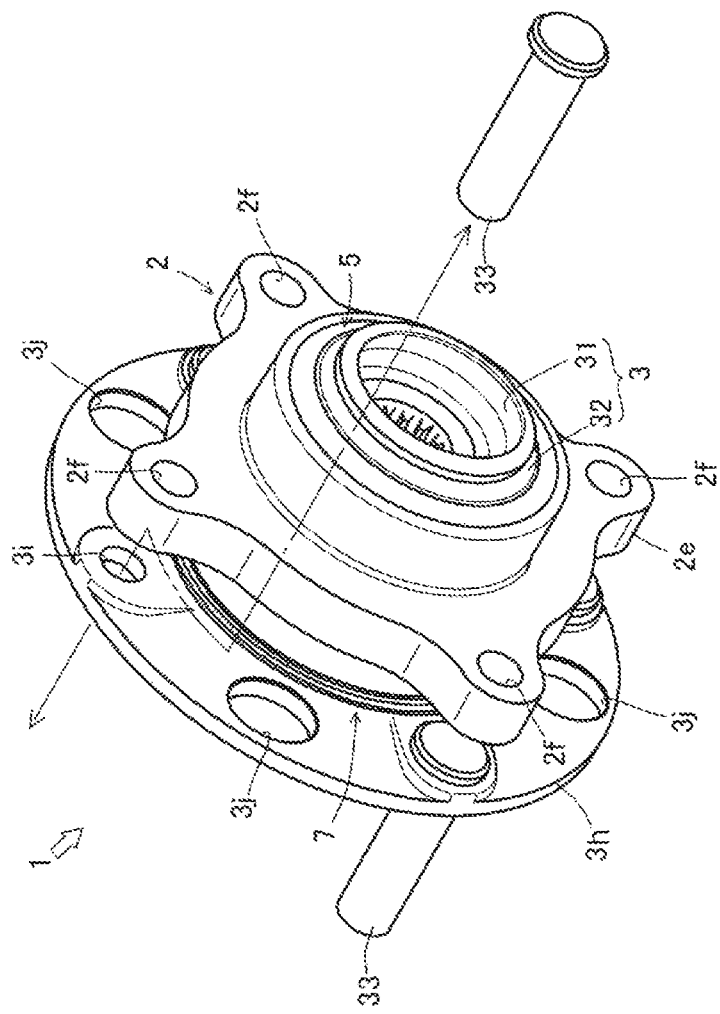
FIG. 10 is a perspective view showing a hub bolt replacement operation.
Figure 11:
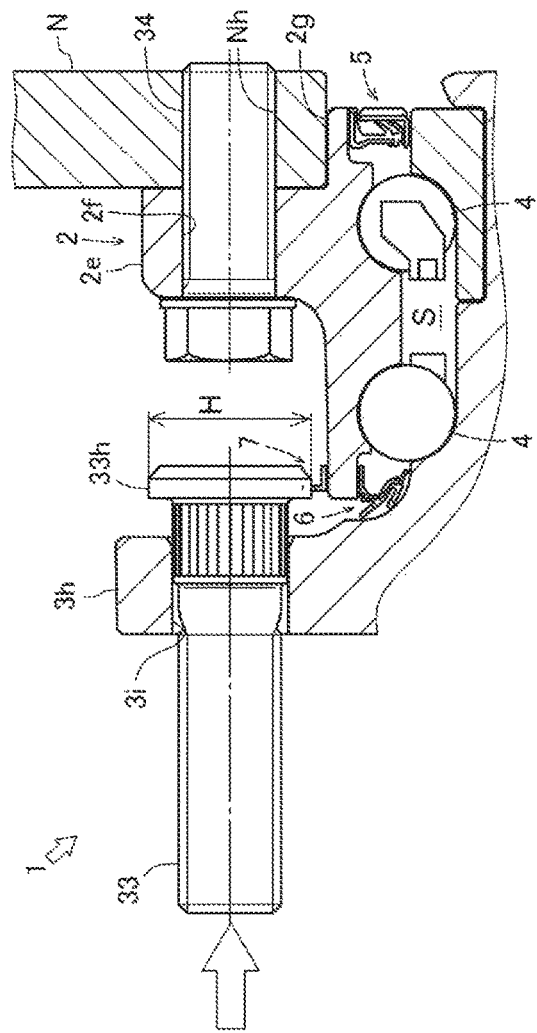
FIG. 11 is a sectional view showing that the head portion of the hub bolt does not interfere with the weir member.

Next, the replacement operation of the hub bolt 33 will be described with reference to FIGS. 10 and 11. FIG. 10 is a perspective view showing the replacement operation of the hub bolt 33. FIG. 11 is a sectional view showing that the head portion 33h of the hub bolt 33 does not interfere with the weir member 7. The replacement operation of the hub bolt 33 is performed by rotating the wheel mounting flange 3h so that the bolt insertion hole 2f and the bolt press-fitting hole 3i are in phase with each other. That is, the phases are matched such that the center of the bolt insertion hole 2f and the center of the bolt press-fitting hole 3i overlap (coaxial) with each other. At this time, the center of the bolt press-fitting hole 3i and the center of the notch portion 7c also overlap (coaxial) with each other.

The replacement operation of the hub bolt 33 is performed by striking the tip end of the hub bolt 33 with a hammer or the like, so that the head portion 33h of the hub bolt 33 passes through the notch portion 7c. Thereafter, the wheel mounting flange 3h is rotated to remove the hub bolt 33 from the recessed portion of the vehicle body mounting flange 2e. Then, a new hub bolt 33 is inserted into the bolt press-fitting hole 3i from the recessed portion of the vehicle body mounting flange 2e, and the wheel mounting flange 3h is rotated. Thereafter, it is pulled in by screwing a nut or the like so that the head portion 33h of the new hub bolt 33 passes through the notch portion 7c.

As described above, in the bearing device 1 for a wheel, when phases of the bolt insertion hole 2f and the bolt press-fitting hole 3i are matched by rotating the wheel mounting flange 3h, the notch portion 7c is formed so that the head portion 33h of the hub bolt 33 fits inside the inscribed circle V centered on the bolt press-fitting hole 3i. According to the bearing device 1 for a wheel, the head portion 33h of the hub bolt 33 can be prevented from interfering with the weir portion (the weir member 7) when the replacement operation of the hub bolt 33 is performed.

Figure 12:
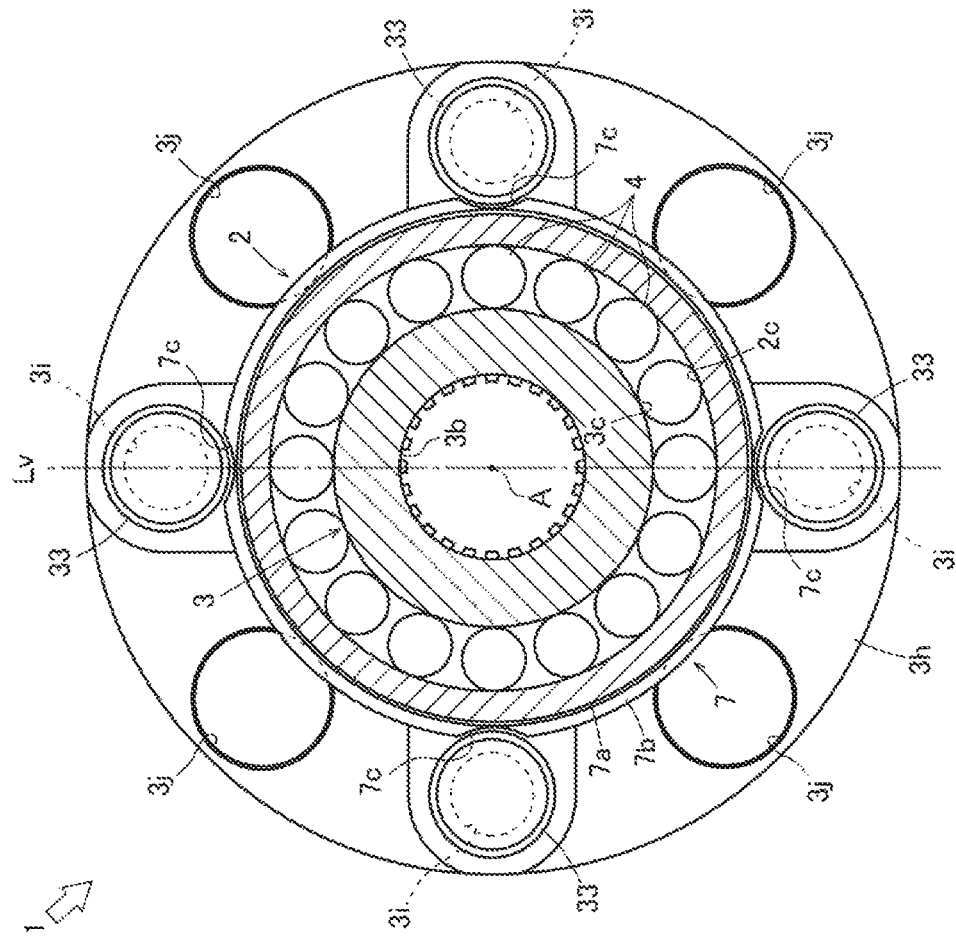
FIG. 12 is a sectional view showing a position of a notch portion of a weir member according to the first embodiment.

In addition, other features of the weir member 7 according to the first embodiment will be described. FIG. 12 is a sectional view showing the position of the notch portion 7c of the weir member 7 according to the first embodiment. Specifically, it is a sectional view showing I-I cross section in FIG. 2. In FIG. 12, a straight line that is parallel to the direction in which gravity acts and intersects with the rotation axis A is represented as a vertical direction line Lv.

The bearing device 1 for a wheel has four hub bolts 33, each of which is provided at a position where the phase angle about the rotation axis A is every 90°. However, the notch portions 7c may be provided at eight locations, which is a multiple. At this time, the notch portions 7c are each formed at a position where the phase angle with respect to the rotation axis A is every 45°. Although the bearing device 1 for a wheel has the four hub bolts 33, it may have, for example, five hub bolts 33, each of which may be provided at a position where the phase angle around the rotation axis A is every 72°. However, ten locations, which is a multiple, may be provided. At this time, the notch portions 7c are each formed at a position where the phase angle with respect to the rotation axis A is every 36°.

As described above, the bearing device 1 for a wheel is formed with the plurality of notch portions 3c. Each of the notch portions 7c is formed so that the head portion 33h of the hub bolt 33 fits inside the inscribed circle V centered on the bolt press-fitting hole 3i. According to the bearing device 1 for a wheel, the plurality of hub bolts 33 overlap the notch portion 7c at the same time, so that the replacement operation can be smoothly carried out.

Figure 13:
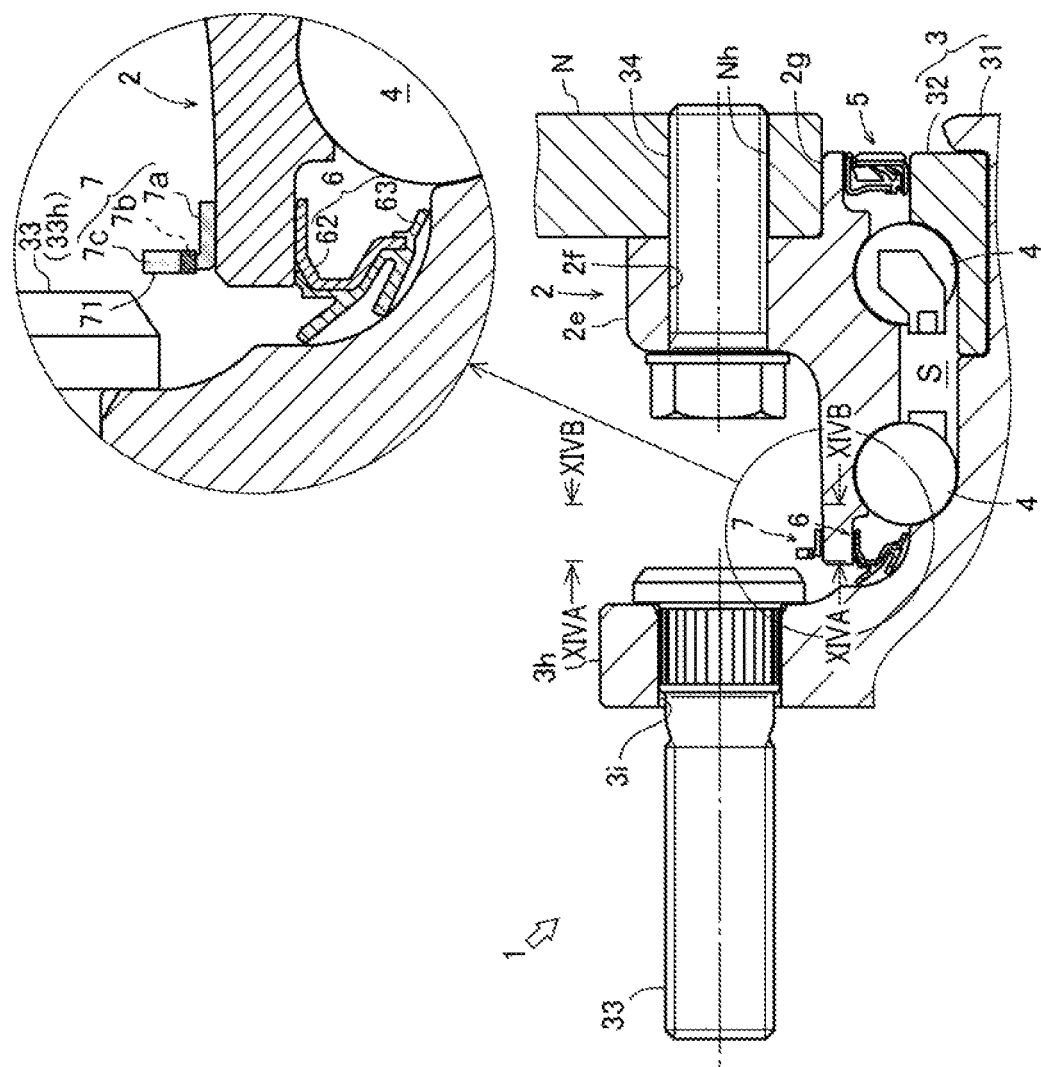
FIG. 13 is a sectional view showing a weir member according to a second embodiment.

Next, the weir member 7 according to the second embodiment will be described with reference to FIGS. 13 and 14. FIG. 13 is a sectional view showing the weir member 7 according to the second embodiment. FIG. 14 is a sectional view showing XIVA-XIVA section and XIVB-XIVB section in FIG. 13. Hereinafter, "radially outside/outward" represents a direction away from the rotation axis A, and "radially inside/inward" represents a direction towards the rotation axis A.

The weir member 7 is fitted to the outer-side outer circumference (outer circumference at the outer-side end portion) of the outer member 2. The weir member 7 is made of, for example, a stainless steel plate such as SUS430 or SUS304, or a cold rolled steel plate such as SPCC. In the weir member 7, an annular steel plate is bent by press work and is formed in a substantially L-shape in an axial sectional view. Thus, the weir member 7 is formed with a cylindrical fitting portion 7a and a disk-shaped standing plate portion 7b that extends radially outward from an end portion of the fitting portion 7a. A plate rubber 71, which is an elastic body, is formed integrally in the standing plate portion 7b, for example, by vulcanization adhesion.

The plate rubber 71 is made of, for example, synthetic rubber such as NBR (acrylonitrile butadiene rubber), HNBR (hydrogenated acrylonitrile butadiene rubber), EPDM (ethylene propylene rubber), ACM (polyacrylic rubber), FKM (fluorinated rubber), or silicon rubber. Alternatively, it may be made of resin such as ABS or PVC. The plate rubber 71 is formed with the notch portion 7c recessed radially inward from the outer edge of the plate rubber 71.

Figure 14A:
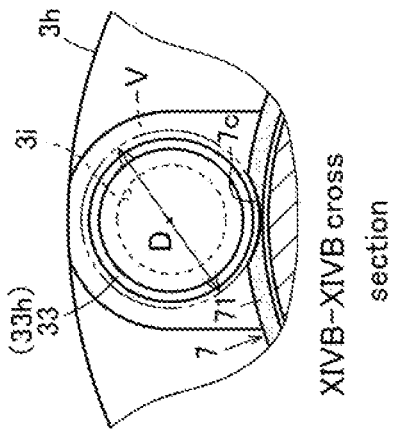
FIGS. 14A and 14B are cross-sectional views taken along section lines XIVA-XIVA and XIVB-XIVB, respectfully, in FIG. 13.

As shown in FIG. 14A, the notch portion 7c has an arc shape as viewed axially, and is formed so that the center of an inscribed circle V overlaps (is coaxial) with the center of the bolt insertion hole 2f. Also in this embodiment, D≥G>F>E is satisfied.

Figure 14B:
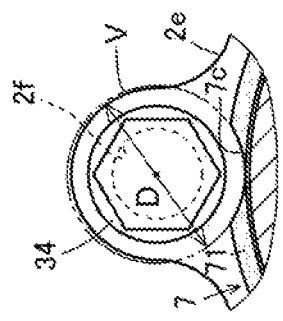

At the same time, as shown in FIG. 14B, the notch portion 7c has an arc shape as viewed axially, and is formed so that the center of an inscribed circle V overlaps (is coaxial) with the center of the bolt press-fitting hole 3i. Also in this embodiment, D>H is satisfied.

As described above, in the bearing device 1 for a wheel, the outer edge portion of the weir portion (the weir member 7) is composed of an elastic body 71. The notch portion 7c is formed in the elastic body 71. According to the bearing device 1 for a wheel, even if the fastening tool 34T of the knuckle bolt 34 interferes with the weir portion (the weir member 7), deformation or the like (deformation or damage) of the weir portion (the weir member 7) can be prevented. Even if the head portion 33h of the hub bolt 33 interferes with the weir portion (the weir member 7), deformation or the like (deformation or damage) of the weir portion (the weir member 7) can be prevented. Therefore, the fastening operation and the replacement operation can be smoothly carried out.

Figure 15:
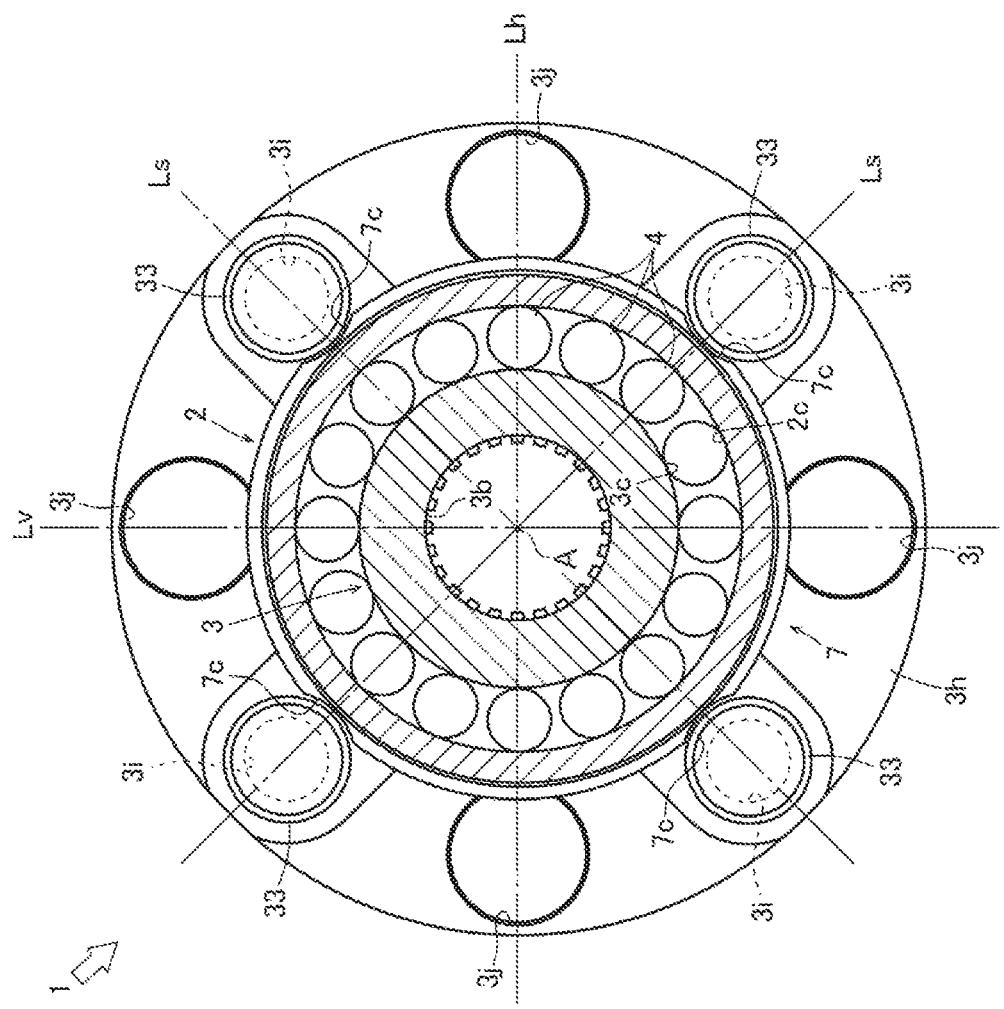
FIG. 15 is a sectional view showing a position of a notch portion of a weir member according to a third embodiment.
Figure 16:
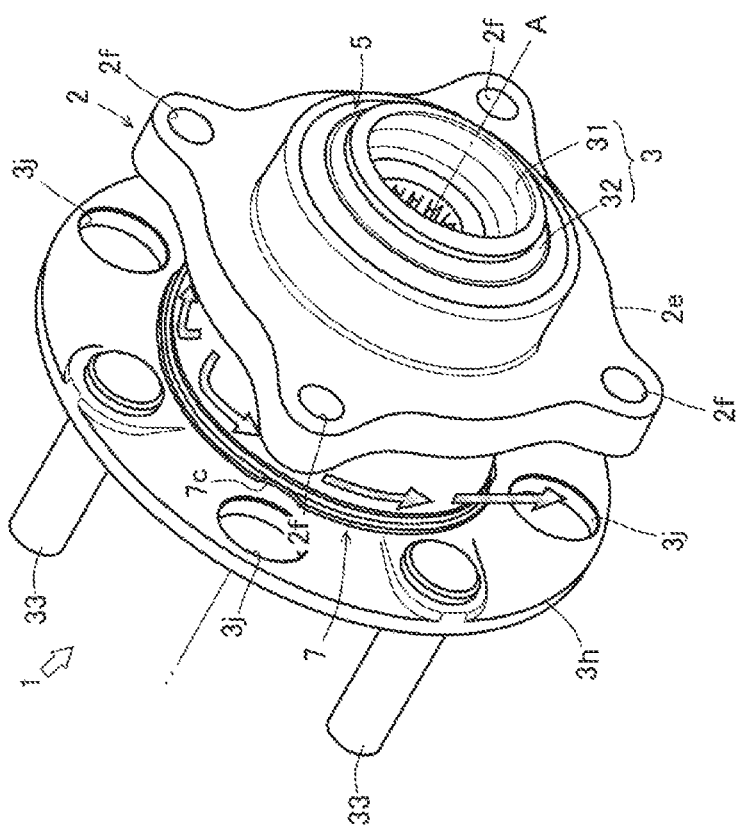
FIG. 16 is a perspective view showing a situation in which muddy water flows along the weir member.

Next, the weir member 7 according to the third embodiment will be described with reference to FIGS. 15 and 16. FIG. 15 is a sectional view showing the position of the notch portion 7c of the weir member 7 according to the third embodiment. Specifically, FIG. 15 is a sectional view corresponding to I-I section in FIG. 2. FIG. 16 is a perspective view showing the state in which muddy water flows along the weir member 7. Here, a straight line that is parallel to the direction in which gravity acts and intersects with the rotation axis A is represented as the vertical direction line Lv. A straight line perpendicular to the vertical direction line V and intersecting with the rotation axis A is defined as a longitudinal direction line Lh. Furthermore, a straight line whose phase angle around the rotation axis L is 45° from the vertical direction line Lv and a straight line whose phase angle around the rotation axis L is 45° from the longitudinal direction line Lh are defined as inclined direction lines Ls. Hereinafter, "upper side of the outer member 2" represents the upper side of the longitudinal direction line Lh, and "lower side of the outer member 2" represents the lower side of the longitudinal direction line Lh.

As shown in FIG. 15, in the weir member 7 according to the third embodiment, four notch portions 7c are formed circumferentially, and the phase angle about the rotation axis A is 90°. However, the notch portions 7c are each formed at a position that does not intersect with the vertical direction line Lv. That is, the notch portions 7c are each formed at or near a position where they intersect with the inclined direction line Ls. Therefore, muddy water flowing through the outer member 2 and muddy water flowing down from the vehicle body flow along the weir member 7, making it difficult to pass through the notch portion 7c (see the arrow in FIG. 16). In addition, muddy water splashed onto the wheel also hits the weir member 7 and flows down, making it difficult to pass through the notch portion 7c.

Thus, in the bearing device 1 for a wheel, on an assumption of the vertical direction line Lv that intersects with the rotation axis A when the rotation axis A is horizontal, the notch portion 7c is formed at a position that does not intersect with the vertical direction line Lv. According to the bearing device 1 for a wheel, on the upper side of the outer member 2, muddy water flowing through the outer member 2, muddy water flowing down from the vehicle body, and the like are less likely to reach the seal member on the outer side (the outer-side seal member 6) through the notch portion 7c. Further, on a lower side of the outer member 2, muddy water or the like splashed onto the wheel is less likely to reach the seal member (6) on the outer side through the notch portion 7c. Therefore, it is possible to prevent the sealing property of the seal member (6) on the outer side from dropping.

Figure 17:
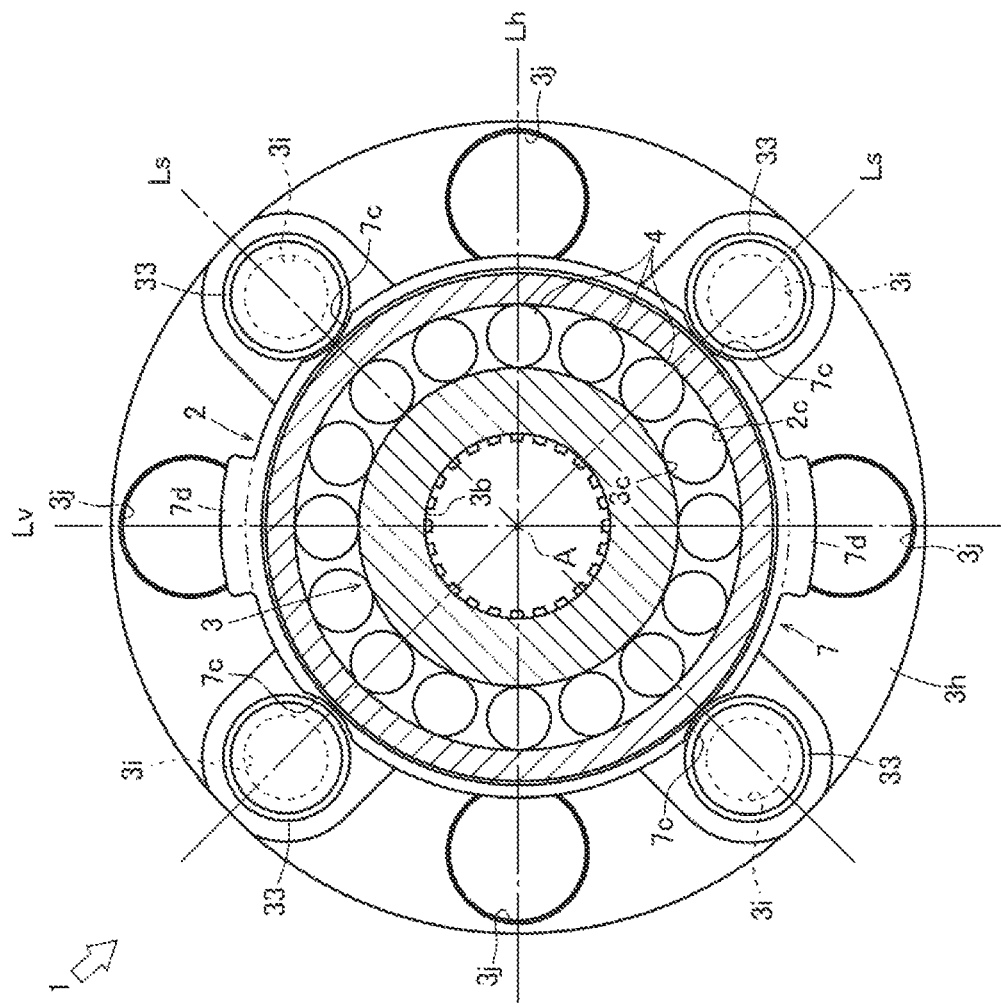
FIG. 17 is a sectional view showing a position of a high weir portion of a weir member according to a fourth embodiment.
Figure 18:
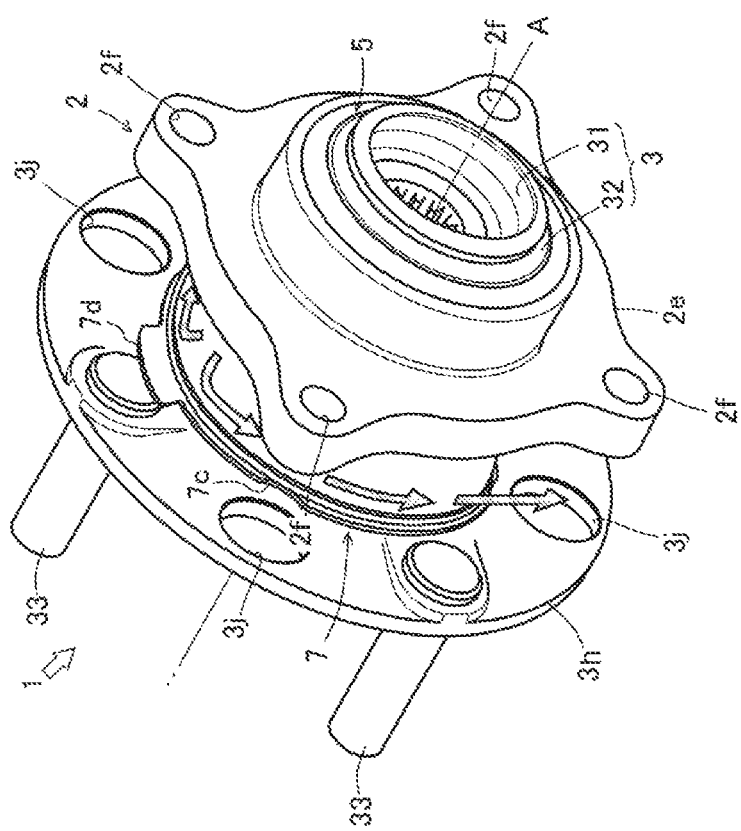
FIG. 18 is a perspective view showing a situation in which muddy water flows along the weir member.
Figure 19:
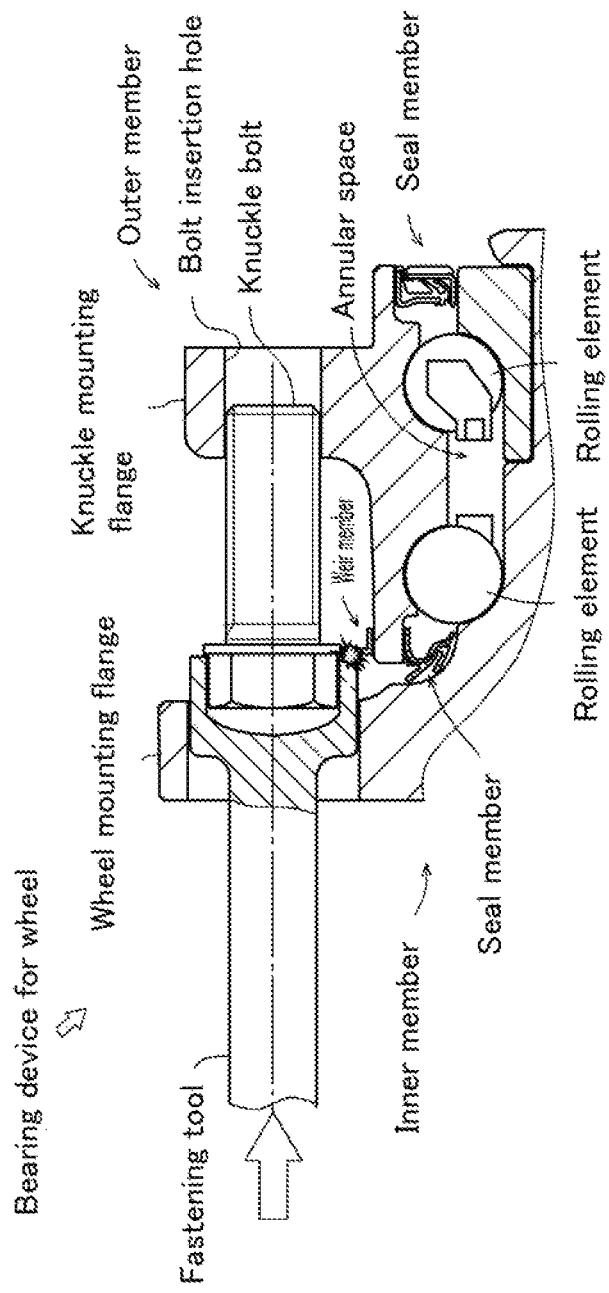
FIG. 19 is a sectional view showing a situation in which the fastening tool of the knuckle bolt interferes with the weir member.
Figure 20:
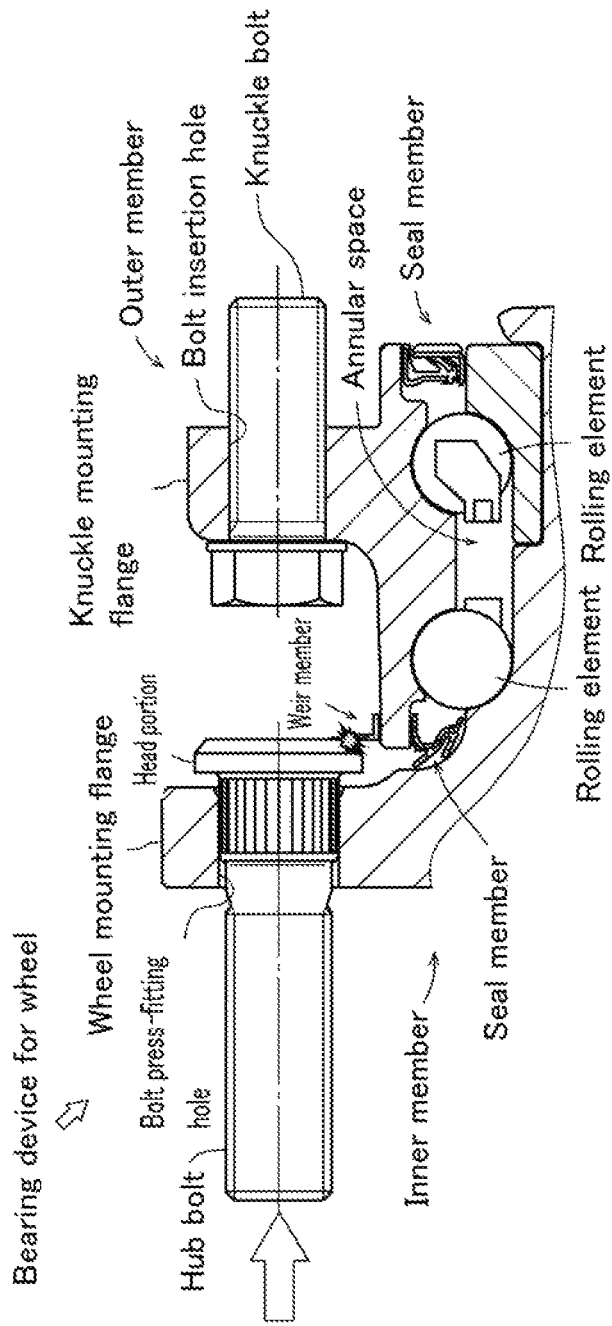
FIG. 20 is a sectional view showing a situation in which the head portion of the hub bolt interferes with the weir member.

Next, the weir member 7 according to the fourth embodiment will be described with reference to FIGS. 17 and 18. FIG. 17 is a sectional view showing the position of a high weir portion 7d of the weir member 7 according to the fourth embodiment. Specifically, FIG. 15 is a sectional view corresponding to I-I section in FIG. 2. FIG. 18 is a perspective view showing the state in which muddy water flows along the weir member 7. Here, a straight line that is parallel to the direction in which gravity acts and intersects with the rotation axis A is represented as the vertical direction line Lv. A straight line perpendicular to the vertical direction line V and intersecting with the rotation axis A is defined as a longitudinal direction line Lh. Furthermore, a straight line whose phase angle around the rotation axis L is 45° from the vertical direction line Lv and a straight line whose phase angle around the rotation axis L is 45° from the longitudinal direction line Lh are defined as inclined direction lines Ls. Hereinafter, "upper side of the outer member 2" represents the upper side of the longitudinal direction line Lh, and "lower side of the outer member 2" represents the lower side of the longitudinal direction line Lh.

As shown in FIG. 17, in the weir member 7 according to the fourth embodiment, four notch portions 7c are formed circumferentially, and the phase angle about the rotation axis A is 90°. Similarly to the weir member 7 according to the third embodiment, the notch portions 7c are each formed at a position that does not intersect with the vertical direction line Lv. However, the weir member 7 according to the fourth embodiment has two high weir portions 7d having a large dimension from the radially inner end to the radially outer end, and the high weir portion 7d are each formed at a position where they intersect with the vertical direction line Lv. Therefore, muddy water flowing through the outer member 2 and muddy water flowing down from the vehicle body are dammed by the high weir portion 7d and flow along the weir member 7, making it difficult to pass through the notch portion 7c (see the arrow in FIG. 18). In addition, muddy water splashed onto the wheel also hits the high weir portion 7d of the weir member 7 and flows down, making it difficult to pass through the notch portion 7c. The high weir portion 7d may be provided on either the upper side or the lower side of the outer member 2.

As described above, in the bearing device 1 for a wheel, the weir portion (the weir member 7) has the high weir portion 7d having a large dimension from the radially inner end to the radially outer end. The high weir portion 7d is formed at a position intersecting with the vertical direction line Lv. According to the bearing device 1 for a wheel, on the upper side of the outer member 2, muddy water flowing through the outer member 2, muddy water flowing down from the vehicle body, and the like are less likely to reach the seal member on the outer side (the outer-side seal member 6) over the weir portion (the weir member 7). On the lower side of the outer member 2, muddy water or the like splashed onto the wheel is less likely to reach the seal member on the outer side (the outer-side seal member 6) over the weir portion (the weir member 7). Therefore, it is possible to further suppress the sealing property of the seal member on the outer side (the outer-side seal member 6) from dropping.

The bearing device 1 for a wheel of the present application has a third-generation structure of an inner member rotating specification that is composed of the outer member 2 having the vehicle body mounting flange 2e and the inner member 3 having one inner ring 32 fitted to the hub ring 31, but it is not limited to the structure. The bearing device 1 for a wheel may have the third-generation structure of an outer member rotating specification that is composed of, for example, an outer member formed as a hub ring and an inner member in which one inner ring is fitted to a support shaft having a vehicle body mounting flange. The bearing device 1 for a wheel may have the second-generation structure of an inner member rotating specification that is composed of an outer member having a vehicle body mounting flange and a pair of inner members which are to be fitted to the outer circumference of the hub ring. The bearing device 1 for a wheel may have the second-generation structure of an outer member rotating specification that is composed of an outer member formed as a hub ring and a pair of inner members which are to be fitted to the outer circumference of the support shaft. The bearing device 1 for a wheel may have the first-generation structure that is composed of an outer member press-fitted into a housing having a vehicle body mounting flange and a pair of inner members which are to be fitted to the outer circumference of a hub ring. Furthermore, the bearing device 1 for a wheel may have the fourth-generation structure in which the hub ring and the universal joint are connected as the inner member. The fourth-generation structure is composed of an outer member having a vehicle body mounting flange and an inner member that is a fitted body of the hub ring and the universal joint.

The present invention is by no means limited to the embodiments and is merely an example, and it goes without saying that the present invention can be practiced in various forms without departing from the scope of the present invention. The scope of the invention is set forth by the description of the claims, and further includes the equivalent meaning described in the claims and all the modifications made within the scope. For example, the weir member 7 according to each of the embodiments is to be fitted to the outer-side outer circumference (outer circumference at the outer-side end portion) of the outer member 2, and includes a weir portion constituted with a projecting portion in which the core metal 62 and the seal rubber 63 constituting the seal member on the outer side (the outer-side seal member 6) projecting radially outward of the outer member 2.

REFERENCE SIGNS LIST

1 Bearing device for wheel
2 Outer member
2c Outer rolling surface
2d Outer rolling surface
2e Vehicle body mounting flange
2f Bolt insertion hole
3 Inner member
31 Hub ring
32 Inner ring
33 Hub bolt
33h Head portion
34 Knuckle bolt
34T Fastening tool
3a Small-diameter step portion
3c Inner rolling surface
3d Inner rolling surface
3h Wheel mounting flange
3i Bolt press-fitting hole
3j Tool insertion hole
4 Rolling element
5 Seal member (inner-side seal member)
6 Seal member (outer-side seal member)
7 Weir member (weir portion)
71 Elastic body
7a Fitting portion
7b Standing plate portion
7c Notch portion
7d High weir portion
A Rotation axis
S Annular space
V Inscribed circle
Lv Vertical direction line

The invention claimed is:

1. A bearing device for a wheel, the bearing device comprising:
an outer member with an outer rolling surface on an inner circumference of the outer member;
an inner member that includes a hub ring with an axially extending step portion and at least one inner ring that is fitted to the step portion, the inner member having an inner rolling surface on an outer circumference of the inner member;
a plurality of rolling elements rollably interposed between the outer rolling surface of the outer member and the inner rolling surface of the inner member;
an inner-side seal member that closes an inner side opening end of an annular space defined by the outer member and the inner member; and
an outer-side seal member that closes an outer side opening end of the annular space defined by the outer member and the inner member,
wherein:
the outer member includes a vehicle body mounting flange with a plurality of bolt insertion holes defined therein, and a plurality of knuckle bolts inserted through the plurality of bolt insertion holes, respectively;
the hub ring includes a wheel mounting flange with a plurality of bolt press-fitting holes defined therein at equal intervals concentrically about a rotation axis of the wheel mounting flange, and a plurality of hub bolts press-fitted in the plurality of bolt press-fitting holes, respectively;
the outer-side seal member is attached to an outer-side inner circumference of the outer member;
a weir portion is attached to an outer-side outer circumference of the outer member such that the weir portion is separate from and opposite to the outer-side seal member and projects radially outward from the outer-side outer circumference of the outer member; and
the weir portion has a plurality of notch portions of a same number as the plurality of knuckle bolts for accommodating a fastening tool of one of the plurality of knuckle bolts.

2. The bearing device according to claim 1, wherein each of the plurality of notch portions is configured to allow a head portion of one of the plurality of hub bolts to fit inside an inscribed circle centered on one of the plurality of bolt press-fitting holes when a phase of one of the plurality of bolt insertion holes and a phase of the one of the plurality of bolt press-fitting holes match.

3. The bearing device according to claim 1, wherein an outer edge portion of the weir portion includes an elastic body, and the notch portions are defined in the elastic body.

4. The bearing device according to claim 1, wherein when the rotation axis of the wheel mounting flange is horizontal,
each of the plurality of notch portions is at a position that does not intersect with a vertical axis that intersects with the rotation axis of the wheel mounting flange.

5. The bearing device according to claim 4, wherein:
the weir portion has a radially expanded section; and
the radially expanded section is at a position that intersects with the vertical axis.

* * * * *